United States Patent Office  3,249,461  
Patented May 3, 1966

3,249,461
ARTICLE HAVING REINFORCING COUPLED TO MATRIX AND REINFORCING FOR SAME
Theodore A. Te Grotenhuis, 7315 Columbia Road, Olmsted Falls, Ohio
No Drawing. Filed Jan. 24, 1962, Ser. No. 168,519
11 Claims. (Cl. 117—76)

The present application is directed to glass fibers and other solids surfaces of which are modified by having vinyl groups carried thereon or attached thereto through siloxane groups; to a method of making such solids; to hydroxyl-reactive or water hydrolyzable compounds having vinyl groups attached to siloxane groups through amide linkages which in turn are connected to silicon through a carbon to silicon bond and to composite articles having an in situ polymerized resin reinforced by one or more of said solids with surfaces thereof modified by vinyl groups which are attached through siloxane groups.

It is known that amine substituted alkyl silicon compounds having the amine group spaced from silicon by at least three carbons are stable. Gammaaminopropyl silicon compounds having also attached directly to silicon one or more hydroxyl-reactive groups such as alkoxy, aryloxy and acetoxy are presently available and used as a coupling agent for treating glass surfaces intended for adhesion to phenolic and epoxy resins. There is also available for a similar purpose the reaction product of an alkylene diamine, such as ethylene diamine and propylene diamine etc., with monochloralkyl silicon compounds such as gammachlorpropyl trialkoxy silane and hydroxyl-reactive polymers thereof. Such reaction products have a nitrogen spaced from silicon by at least three carbons and have at least one water-hydrolyzable group (i.e., one group which condenses with the hydroxyl on solid surfaces). Similar products may be obtained by reacting an alkylene diamine with any chloralkyl silicon alkoxide having one to three alkoxy (or aryloxy or acetoxy) groups attached to silicon and halogen spaced from silicon by at least three carbons.

While such compounds are suitable as coupling compounds between glass etc. and epoxy resins, they are unsuitable as coupling compounds between glass (or other solids) and resins polymerized in situ from aliphatically unsaturated monomers such as usually used unsaturated polyester-olefinic mixtures, etc. As described and claimed in my Patent No. 2,742,378, for chemical adhesion to in situ formed polymers of styrene and other olefinically unsaturated monomers, the surfaces of the fibers and pigments should have vinyl $$(-\underset{|}{\overset{|}{C}}=\underset{|}{\overset{|}{C}}-)$$

groups bonded thereto through siloxane groups.

An object of the present invention is to provide a compound for treating surfaces such as those of glass fibers that will attach thereto, through siloxane groups, groups having a dual function; i.e. (1) it will attach to the surfaces through siloxane groups the vinyl groups (i.e. ethylenically unsaturated groups) as required by my Patent 2,742,378 for interaction with unsaturated monomers such as styrene, methyl methacrylate, and unsaturated polyesters, and (2) it will attach also through the same siloxane groups (and preferably in a linkage between the vinyl groups and the siloxane groups) —NH— groups for reaction with epoxy and phenolic resins during in situ polymerization.

Another object of the present invention is to provide solids such as glass, silica, etc., which normally have hydroxyl or equivalent hydrophilic groups thereon but which are modified by having attached thereto vinyl groups of acrylic (including methylacrylic) compounds which vinyl groups (ethylenyl groups) are attached to said solid through siloxane groups as described in Patent 2,742,378 and also through an intervening amide linkage having a carbon to silicon bond.

Another object of the present invention is to provide novel compounds which will react with surfaces such as those of glass, silica, titania, phthalocyanine, etc., that have hydroxyl or other suitable reactive hydrogen groups thereon, to attach vinyl groups to said surfaces through siloxane groups.

Another object is to provide such solids which have both vinyl groups and —NH— groups attached to their surfaces through siloxane groups.

A further object of this invention is to provide composite articles having an in situ polymerized resin (preferably a polymer (including copolymers) of an olefinic monomer) and contacting solid modified as above so that a chemical bond is formed between said resin and said solid.

Other objects will be apparent from the following description of the invention:

In accordance with one aspect of the present invention, a polymerizable olefinic acid amide, for example, such as an acrylic (including methacrylic) acid amide, of an hydroxy-reactive amino silicon compound having all nitrogen atoms spaced from silicon by at least three carbon atoms which are directly attached to silicon is prepared. In accordance with another aspect of my invention, the surface of a solid such as glass fibers or pigment or other solid having hydroxyl groups thereon is reacted with such acrylic acid amide to attach the vinyl groups to the solid surface through siloxane groups and preferably also to attach —NH— groups through the same siloxane groups.

In accordance with another aspect, the solid thus treated is incorporated in or placed in contact with polymerizable resin-forming material such as polyester-styrene or polyestermethyl methacrylate laminating resin or other monomeric polymerizable olefinic compound polymerizable to the solid state and said material polymerized in situ so that a chemical bond is produced between the solid resin formed by the polymerization and the said surface. When the amino nitrogen contains an —NH— group, similar interaction with epoxy resins and phenolic resins may occur during polymerization thereof to form a bond with such in situ formed resin.

Examples of the hydroxyl-reactive silicon compounds of the present invention suitable for treatment of solids having hydroxyl groups thereon to attach vinyl groups through siloxane groups are:

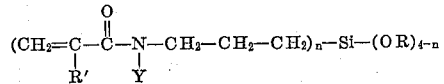

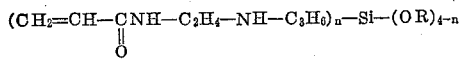

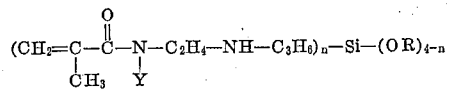

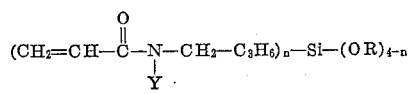

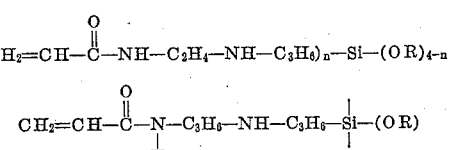

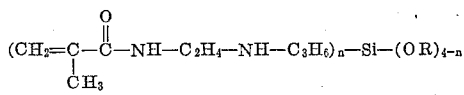

where $n=1-3$ inclusive; where Y is

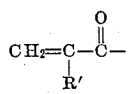

or hydrogen; where R' is hydrogen or alkyl such as methyl, ethyl, etc., and where —OR is acetoxy, aryloxy alkoxy, such as methoxy, or —OH and where free silicon valences are connected to a member of the group consisting of the oxygen of other silicon-oxygen containing groups, the oxygen of said —OR, and carbon of alkyl, and carbon of phenyl. When Y is hydrogen the compounds are suitable for general purpose coupling compounds, i.e., for epoxy, phenolic, melamine and olefinic resins formed in situ.

The compounds of the present invention are prepared by reacting amino siloxanes, alkoxides, etc. having at least three carbons in a group that connects the silicon with amino nitrogen, with an acid chloride or anhydride of an ethylenically unsaturated acid preferably one or more of acrylo chloride, methacrylo chloride, acrylic acid anhydride and methacrylic acid anhydride. The usual reaction conditions for forming amides by reacting chlorides or anhydrides are observed, except however a small amount of suitable polymerization inhibitor such as dinitro benzene, etc. is preferably present to prevent vinyl type polymerization. When one reacts a mole or more of acrylo or methacrylo chloride (or the equivalent thereof) per amine hydrogen with said aminoalkyl silicon alkoxide or of or with said condensation product of an alkylene diamine with a chloro alkyl silicon alkoxide having three or more carbons between the chlorine and silica, Y in the above compounds is an acrylo group.

The surfaces of solids to be modified in accordance with the invention may be treated by wetting them with a solution in organic liquid or by an emulsion in aqueous liquid (which may also contain a protective colloid such as polyvinyl alcohol, polyvinyl pyrrolidone or its acetate copolymer etc.) allowing the wetted surface to dry and heating the wetted solid at elevated temperature suitable to condense the hydrolyzable or hydroxyl reactive groups with hydroxyl on the surface. Generally a temperature of 100 to 250° C. may be used about 150° C. being preferred.

The following examples in which parts are by weight illustrate the invention:

Example 1

One gram mol of gamma aminopropyl trimethoxy silane of the formula $NH_2$—$C_3H_6$—$Si(OCH_3)_3$ is incorporated into a jacketed glass lined pressure vessel equipped for agitation and containing 500 cc. of an anhydrous mixture of equal parts of ethyl ether and toluene and one gram of dinitrobenzene. About 1.1 moles of methacrylochloride is then added slowly while maintaining the temperature below 100° C. and preferably at about 35° C. for about one hour. The solution of reaction product is shaken thoroughly for one hour with excess of a 5% aqueous sodium carbonate solution to remove the HCl and the ether-toluene solution separated and retained. The main reaction product is $$CH_2=C(CH_3)—CO—NH—C_3H_6—Si(OCH_3)_3$$

which is hydroxyl-reactive and capable of attaching the vinyl groups thereof to surfaces through siloxane groups as described in my aforementioned patent and also of providing —NH— groups for reaction with epoxides. When acrylochloride is used in place of methacrylo chloride the corresponding product is produced.

Example 2

In the above example the neutralized reaction product of ethylene diamine and gammachlorpropyl-trimethoxy-silane having the formula $$NH_2—CH_2—CH_2—NH—C_3H_6—Si(OR)_3$$

is substituted for the gammaaminopropyl-trimethoxy-silane of Example 1, other conditions remaining the same. The product produced is primarily

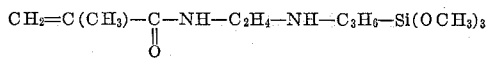

Example 3

2.1 moles of acrylo chloride are substituted for the 1.1 moles of methacrylo chloride in Example 1, other conditions remaining the same. The product produced is chiefly

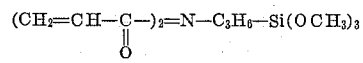

This product is capable of attaching through a single siloxane group two vinyl groups to surfaces of glass fibers and other textile fibers including those of cellulose, nylon, Dacron (polyethylene terephalate) as well as to other surfaces. It is not however suitable for also coupling epoxy and phenolic resins as are the compounds of Examples 1 and 2.

When in the above examples a strong sodium or potassium hydroxide solution is used in place of sodium carbonate solution and the resultant ether-toluene solution again washed with excess of very dilute HCl solution to remove sodium or sodium chloride the principal product is the corresponding hydroxide or partial polymer thereof having the group

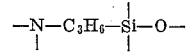

where free silicon valences are attached to oxygen or carbon instead of the alkoxide. The partial polymer will have this

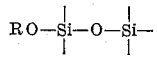

group. Such products may also be used for coupling purposes.

The trimethoxy silane used initially in Examples 1 and 2 may be substituted by other alkoxy silanes including the mono and dimethoxides, or by the corresponding aryloxides, such as mono, di or tri phenoxides or even the mono, di or triacetoxides etc. The methoxides may be substituted by the corresponding ethoxide or other alkoxides as desired. Thus, instead of using the mono-(gammaaminopropyl)trimethoxy silane of Example 1, the di(gammaaminopropyl) dimethoxy silane or the tri-(gammaaminopropyl) methoxy silane may be used. By varying the proportion of acrylochloride or other olefinically unsaturated acid chloride and by the simultaneous use of gammaaminopropyl alkoxy silane compounds having the desired number of amino groups per silicon atom compounds having from one to six vinyl groups per silicon atom may be produced which compounds correspondingly contain five to zero amino hydrogens. Instead of the initial compound having a gammaaminopropyl group above any compound with a group of the formula

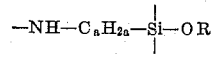

may be used where $a$ is at least three and preferably no more than twelve.

It is therefore obvious that a number of compounds which function in a similar manner may be produced by selecting mole ratio of unsaturated acid chloride and number of —NH— groups in initial compound. Similarly by substituting for the initial products of Example 2 compounds containing two or three of the $$NH_2-C_bH_{2b}-NH-C_aH_{2a}-$$

groups (where $b$ is one or two to ten and where $a$ is at least three and preferably less than twelve) and correspondingly less —OCH$_3$ groups and proportionating the mole ratio of the acrylochloride or methacrylochloride, the number of vinyl groups per silicon atom may be varied up to a maximum of nine. The desirability of the compound as a coupling agent for epoxy and phenolic and melamine and urea resins polymerized or cured in situ becomes correspondingly less as the number of amino hydrogens that are substituted becomes greater than one. The hydroxyl-reactive groups such as alkoxy groups may be substituted by other alkoxy groups, aryloxy or acetoxy groups if desired. After reaction with acid chloride such may also be hydrolyzed to hydroxyl.

*Example 4*

Ten grams of heat cleaned glass cloth are immersed in the solution from Example 1 removed and allowed to drain of excess liquid. The cloth is then heated to about 175° C. for a short time to react the hydroxyl reactive groups with hydroxyl on the surface of the glass and bond thereto:

$$CH_2=C(CH)_3-CO-NH-C_3H_6-\overset{|}{Si}-O-$$

groups so that the vinyl groups, $$CH_2=\overset{|}{C}-$$

become bonded to the glass through the siloxane groups of the formula:

$$-\overset{|}{Si}-O-$$

where free silicon valences are attached to oxygen or carbon and the free oxygen valence is connected to the surface.

*Example 5*

Glass cloth treated as in Example 4 is wetted by immersion in customary polymerizable liquid unsaturated polyester-styrene containing about 2% of benzoyl peroxide. Several layers of the thus wetted cloth are plied up and covered with cellophane. The laminate is freed from contained air and heated at 90° C. at about 15 p.s.i. pressure until the monomers have polymerized to the solid state, whereupon the resin becomes coupled to the glass by the interaction (interpolymerization) of the polyester and styrene with the vinyl groups which are adhered to the glass through siloxane groups.

*Example 6*

The styrenated polyester resin of Example 5 is substituted by a polymerizable epoxy resin which is the condensation of bisphenol A and epichlor-hydrin activated by amine. The laminate produced has the resin coupled to the glass through the reaction product of the residual amine groups which are bonded to glass through siloxane groups.

In Example 5 the polymerizable styrenated polyester which consists of about 60 parts of styrene and 100 parts of a resinous liquid esterification product of one mole of maleic anhydride, one mole of phthalic anhydride, and two moles of ethylene glycol, may be substituted by methyl methacrylate and other olefinic resin-forming materials such as any of those mentioned in my aforementioned prior patent, particularly those having conjugated double bonds. Styrenes such as vinyl toluene and alphamethyl styrene and acrylic ester amides and nitriles are preferred for the mono-olefinic components.

The aforementioned compounds may be partially hydrolyzed so that some of the silicon atoms are connected by $$-\overset{|}{Si}-O-\overset{|}{Si}-$$

bonds but some Si—OR bonds remain. The coupling agents on the glass in Example 5 may be substituted by any of the compounds previously mentioned with similar results. The acrylochloride of Examples 1 and 2 may be substituted by an equivalent (½ molar) amount of the acrylic anhydride also with similar results. The acrylic or methacrylic acid chloride or anhydrides may be substituted by other olefinically unsaturated acid chlorides having a polymerizable group thereon including cinnamic acid chloride and linoleic acid chloride if desired but the acrylic acid chlorides are preferred. Even alpha beta unsaturated dicarboxylic acid chlorides or anhydrides such as maleic anhydride may be used in equivalent amounts in place of the acrylic acid chloride above. The compounds produced are however usually a mixture of $$\begin{array}{c} CH-\overset{O}{\overset{\|}{C}} \\ \| \phantom{CH}\diagdown \\ \phantom{CH-}N-C_aH_{2a}-Si(OR)_3 \\ CH-C \diagup \\ \phantom{CH-}\underset{\|}{\|} \\ \phantom{CH-}O \end{array}$$

and $$\underset{CH-CO-NH-C_aH_{2a}-Si-(OR)_3}{\overset{CH-CO-NH-C_aH_{2a}-Si-(OR)_3}{\|}}$$

assuming that the initial compound $$NH_2-C_aH_{2a}-Si(OR)_3$$

is used. The compounds produced will obviously in any case correspond to the initial amine compound reacted or be partial polymers of the resultant compound.

The compounds of the present invention are useful as coupling agents between surfaces such as those of cellulose, including cotton, rayon, wool, glass surfaces, surfaces of inorganic pigments, phthalocyanine pigments and also surfaces of amine polymers such as nylon. They may be used as coupling agents between tire cord fabric and rubbers including both polyurethane and unsaturated rubbers. The surfaces to be modified should be heated at suitably elevated temperatures with the materials in contact therewith to obtain best results.

When one uses the aminoalkyl silanes having one to two alkyl groups such as methyl, ethyl or aryl groups such as phenyl in addition to a —OR group and an aminoalkyl group having 3 or more carbons between amino and silicon, the corresponding amide compounds are produced which are also suitable for coupling agents. Thus, when gammaaminopropylmethyl dimethoxy silane is substituted on an equivalent basis for the silane employed in Example I the principal reaction product is $$CH_2=C(CH_3)-CO-NH-C_3H_6-\underset{\underset{CH_3}{|}}{Si}=(OCH_3)_2$$

which is useful for the same purposes as is the product of Example 1.

It will be understood that the above description is by way of illustration rather than limitation and that, in accordance with the provisions of the patent statutes, variations and modifications of the specific methods and articles disclosed herein may be made without departing from the spirit of the invention.

Having described my invention, I claim:

1. A fiber glass reinforced composite article comprising (1) in situ polymerized solid polymer polymerized from liquid comprising a member of the group consisting of solidifiable epoxy resins, solidifiable phenolic resins and polymerizable polyester resins and polymerizable olefinic compounds, (2) glass fibers for reinforcing said solid polymer and (3) an interface comprising a reaction product of coupling compound bonded to said fibers and in chemical combination with said solid polymer, said interface being different from said polymer and the body of said fibers and comprising a reaction product of groups of said coupling compound and at least one ingredient of said liquid, said coupling compound being an alpha-beta olefinically unsaturated carboxylic acid amide of a hydroxy-reactive aminoalkyl-substituted silane having all silicon valences directly connected to a member of the group consisting of oxygen and carbon, and having all amine nitrogen atoms connected to silicon through a hydrocarbon chain of at least three carbon atoms, which chain is connected to silicon by a carbon-to-silicon bond.

2. In a method of making a composite article comprising substrate which normally has hydroxyl groups thereon bonded together through an in situ polymerized solid polymer, the steps which comprise treating said substrate with a fluid comprising an alpha-beta olefinically unsaturated aliphatic carboxylic acid amide of hydroxy reactive aminoalkyl-substituted silane having all amine nitrogen atoms connected to silicon through a hydrocarbon chain of three to twelve carbon atoms, one of which is directly connected to the silicon atom of said silane and having all silicon atoms directly connected to a member of the group consisting of carbon of said hydrocarbon chain, lower alkyl, phenyl and oxygen, and polymerizing a polymer forming material selected from the group consisting of solidifiable epoxy resins, solidifiable phenolic resins, polymerizable polyester resins and olefinic compounds polymerizable to a solid state in contact with the said treated substrate.

3. In a method of preparing a rigid substrate which normally carries hydroxyl groups thereon for reception of liquid polymerizable resins, the step which comprises treating said substrate with a fluid comprising an alpha-beta olefinically unsaturated aliphatic carboxylic acid amide of a hydroxy-reactive aminoalkyl-alkoxy silane having all amine nitrogen atoms separated from silicon by a hydrocarbon chain of three to twelve carbon atoms, one of which carbon atoms is connected to silicon by a carbon to silicon bond and heating the treated substrate.

4. An inorganic solid having attached to the surface thereof (CH$_2$=C(Y)—CO—NH—C$_b$H$_{2b}$
—NH—C$_a$H$_{2a}$)$_x$—Si(—O—)$_{(4-x)}$ groups where $a$ is an integer of 3 to 12; where $b$ is an integer of 1 to 10, where Y is a member of the group consisting of alkyl and hydrogen, and where $x$ is 1 to 3.

5. A fiber glass reinforced composite article comprising (1) a solid polymer polymerized from liquid comprising an olefinically unsaturated monomer, (2) glass fibers for reinforcing said solid polymer and (3) an interface comprising a coupling compound bonded to said fibers and in chemical combination with said solid polymer, said interface being different from said polymer and the body of said fibers and comprising a reaction product of olefinically unsaturated groups from said monomer with vinyl groups contained in groups on the portions of said fibers, which latter groups have the general formula, (CH$_2$=C(Y)—CO—NH—C$_b$H$_{2b}$
—NH—C$_a$H$_{2a}$)$_x$—Si(—O—)$_{(4-x)}$ where $a$ is an integer of 3 to 12, where $b$ is an integer of 1 to 10, where Y is a member of the group consisting of alkyl and hydrogen, and where $x$ is 1 to 3.

6. A composite article of claim 5 wherein the solid polymer is polymerized from a liquid comprising a polymerizable aryl olefinic compound.

7. A product according to claim 6 in which the said liquid comprises styrene.

8. An inorganic solid suitable for reinforcing an in situ polymerized solid organic polymer, said inorganic solid normally containing reactive hydrogen, but having surface portions modified by having carried thereon through siloxane groups vinyl groups of an alpha-beta unsaturated aliphatic acid amide, said vinyl groups being contained in groups of the general formula,

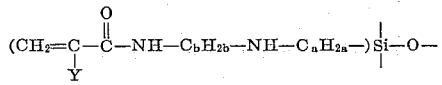

where Y is a member of the group consisting of alkyl and hydrogen, and where $a$ is an integer of 3 to 12, inclusive, and where $b$ is an integer of 1 to 10, and where the free silicon valences are directly connected to a member of the group consisting of alkyl, phenyl, oxygen, and the group,

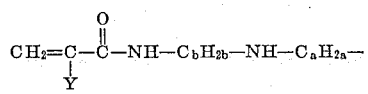

9. A textile fiber which normally contains hydroxyl groups but which is modified by having vinyl groups of an alpha-beta unsaturated aliphatic acid amide attached to the surface thereof through a siloxy bond, said amide having the general formula,

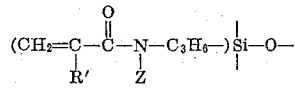

where Z is a member of the group consisting of

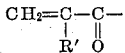

and hydrogen, R' is a member of the group consisting of methyl and hydrogen, and where the free silicon valences are directly connected to a member of the group consisting of lower alkyl, oxygen, phenyl, and the group

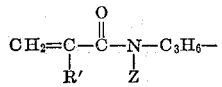

10. The product according to claim 9 wherein the textile fiber is a glass fiber.

11. In a method of preparing an inorganic solid substrate which normally carries hydroxyl groups thereon for reception of liquid polymerizable resins selected from the group consisting of solidifiable epoxy resins, solidifiable phenolic resins, polymerizable olefinically unsaturated polyester resins, and olefinic compounds polymerizable to a solid state, the step which comprises wetting said substrate with a fluid comprising an alpha-beta olefinically unsaturated aliphatic carboxylic acid amide of an aminoalkyl-silicon compound of the general formula

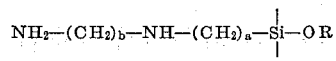

where $a$ is an integer of 3 to 12, $b$ is an integer of 1 to 10, and the free silicon valences are connected to a member of the group consisting of NH$_2$—(CH$_2$)$_b$—NH—(CH$_2$)$_a$— lower alkyl, phenyl and —OR, where R is selected from the group consisting of alkyl, hydrogen,

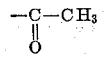

and phenyl, said amide having all amine nitrogen atoms connected through a hydrocarbon chain of 3 to 12 carbon atoms, and which chain is connected to silicon by a carbon-to-silicon bond, and drying said treated substrate.

(References on following page)

References Cited by the Examiner

UNITED STATES PATENTS

| | | | |
|---|---|---|---|
| 2,563,288 | 8/1951 | Steinman | 117—126 |
| 2,919,173 | 12/1959 | Roff | 260—448.8 |
| 2,943,103 | 6/1960 | Jex et al. | 260—448.8 |
| 2,946,710 | 7/1960 | Plueddemann | 117—126 |
| 2,974,062 | 3/1961 | Collier | 117—76 |
| 3,007,957 | 11/1961 | Bailey et al. | 260—448.8 |

RICHARD D. NEVIUS, *Primary Examiner.*

JOSEPH B. SPENCER, *Examiner.*

P. H. KONDO, R. B. MURRAY, A. ROSENSTEIN, *Assistant Examiners.*